(12) United States Patent
Raichur et al.

(10) Patent No.: US 9,977,831 B1
(45) Date of Patent: May 22, 2018

(54) TARGETING USERS' INTERESTS WITH A DYNAMIC INDEX AND SEARCH ENGINE SERVER

(75) Inventors: Arvind Raichur, Albuquerque, NM (US); Becky Raichur, Albuquerque, NM (US)

(73) Assignee: DISE Technologies, LLC, Albuquerque, NM (US)

( * ) Notice: Subject to any disclaimer, the term of this patent is extended or adjusted under 35 U.S.C. 154(b) by 0 days. days.

(21) Appl. No.: 12/611,706

(22) Filed: Nov. 3, 2009

Related U.S. Application Data

(63) Continuation-in-part of application No. 11/932,386, filed on Oct. 31, 2007, now Pat. No. 8,504,554, which is a continuation-in-part of application No. 09/641,031, filed on Aug. 16, 2000, now Pat. No. 7,613,992.

(60) Provisional application No. 60/149,322, filed on Aug. 16, 1999.

(51) Int. Cl.
G06F 17/30 (2006.01)

(52) U.S. Cl.
CPC .. *G06F 17/30861* (2013.01); *G06F 17/30873* (2013.01)

(58) Field of Classification Search
CPC ............... G06F 17/30861; G06F 17/30873
USPC ......... 707/999.003, 705, 706, 758; 705/14.4, 705/14.49, 14.55, 14.66, 14.67, 14.73
See application file for complete search history.

(56) References Cited

U.S. PATENT DOCUMENTS

| | | |
|---|---|---|
| 5,271,897 A | 12/1993 | Wurschum et al. |
| 5,544,354 A | 8/1996 | May et al. |
| 5,551,027 A | 8/1996 | Choy et al. |
| 5,649,186 A | 7/1997 | Ferguson |
| 5,652,880 A | 7/1997 | Seagraves |
| 5,685,003 A | 11/1997 | Peltonen et al. |
| 5,708,825 A | 1/1998 | Sotomayor |
| 5,721,897 A | 2/1998 | Rubinstein |
| 5,748,954 A | 5/1998 | Mauldin |
| 5,781,904 A | 7/1998 | Oren et al. |
| 5,832,495 A | 11/1998 | Gustman |
| 5,842,206 A | 11/1998 | Sotomayor |
| 5,848,410 A | 12/1998 | Walls |
| 5,864,863 A | 1/1999 | Burrows |

(Continued)

FOREIGN PATENT DOCUMENTS

| | | |
|---|---|---|
| WO | 2008009515 | 1/2008 |
| WO | 2011/056169 | 5/2011 |

OTHER PUBLICATIONS

Dayal, Umeshwar, "Database Technology at a Crossroads", *ACM Computing Surveys 28* Dec. 1996.

(Continued)

*Primary Examiner* — Alicia Willoughby
(74) *Attorney, Agent, or Firm* — Wilcox & Myers, P.C.; Jeffrey D. Myers

(57) ABSTRACT

A method (and concomitant apparatus and computer-readable medium comprising software) for providing personalized advertising to users of internet web pages comprising providing an index server maintaining a dynamic index to internet web pages and employing a hierarchical plurality of topic categories whose contents are maintained and updated by the index server, permitting a user to specify any subset of the plurality of topic categories, and serving to the user an advertisement based upon the subset specified by the user.

18 Claims, 8 Drawing Sheets

(56) References Cited

U.S. PATENT DOCUMENTS

| | | | |
|---|---|---|---|
| 5,913,210 A | 6/1999 | Call | |
| 5,920,854 A | 7/1999 | Kirsch et al. | |
| 5,956,722 A | 9/1999 | Jacobson et al. | |
| 5,960,429 A | 9/1999 | Peercy et al. | |
| 5,963,205 A | 10/1999 | Sotomayor | |
| 5,970,489 A | 10/1999 | Jacobson et al. | |
| 5,983,227 A | 11/1999 | Nazem et al. | |
| 6,073,170 A | 6/2000 | Sumita et al. | |
| 6,091,930 A | 7/2000 | Mortimer et al. | |
| 6,199,098 B1 | 3/2001 | Jones et al. | |
| 6,236,987 B1 | 5/2001 | Horowitz et al. | |
| 6,271,846 B1 | 8/2001 | Martinez et al. | |
| 6,314,424 B1 | 11/2001 | Kaczmarski et al. | |
| 6,334,124 B1 | 12/2001 | Bouchard | |
| 6,334,145 B1 | 12/2001 | Adams et al. | |
| 6,338,059 B1 | 1/2002 | Fields et al. | |
| 6,349,307 B1 | 2/2002 | Chen | |
| 6,438,580 B1 | 8/2002 | Mears et al. | |
| 6,457,009 B1 | 9/2002 | Bollay | |
| 6,480,853 B1 | 11/2002 | Jain | |
| 6,493,702 B1 | 12/2002 | Adar et al. | |
| 6,631,496 B1 | 10/2003 | Li et al. | |
| 6,725,227 B1 | 4/2004 | Li | |
| 6,961,731 B2 | 11/2005 | Hollbrook | |
| 7,031,961 B2 | 4/2006 | Pitkow et al. | |
| 7,181,438 B1 | 2/2007 | Szabo | |
| 7,613,992 B1 | 11/2009 | Raichur et al. | |
| 7,716,223 B2 | 5/2010 | Haveliwala et al. | |
| 7,801,896 B2 | 9/2010 | Szabo | |
| 7,881,971 B1 | 2/2011 | Nguyen et al. | |
| 7,987,185 B1* | 7/2011 | Mysen et al. | 707/733 |
| 8,307,275 B2 | 11/2012 | Clark et al. | |
| 8,504,554 B2 | 8/2013 | Raichur et al. | |
| 2002/0016786 A1 | 2/2002 | Pitkow et al. | |
| 2003/0130993 A1* | 7/2003 | Mendelevitch et al. | 707/3 |
| 2004/0059705 A1* | 3/2004 | Wittke et al. | 707/1 |
| 2004/0139107 A1 | 7/2004 | Bachman | |
| 2004/0260679 A1 | 12/2004 | Best et al. | |
| 2005/0240580 A1 | 10/2005 | Zamir | |
| 2005/0256866 A1 | 11/2005 | Lu et al. | |
| 2005/0278317 A1 | 12/2005 | Gross et al. | |
| 2005/0289127 A1 | 12/2005 | Giampaolo et al. | |
| 2006/0112076 A1* | 5/2006 | Burris | G06F 17/30707 |
| 2006/0218208 A1 | 9/2006 | Nagami | |
| 2006/0294192 A1 | 12/2006 | Mao et al. | |
| 2007/0006322 A1 | 1/2007 | Karimzadeh et al. | |
| 2007/0011155 A1 | 1/2007 | Sarkar | |
| 2007/0156636 A1 | 7/2007 | Norton | |
| 2007/0156677 A1* | 7/2007 | Szabo | 707/5 |
| 2007/0174260 A1 | 7/2007 | Bachman | |
| 2007/0244750 A1* | 10/2007 | Grannan et al. | 705/14 |
| 2008/0071864 A1* | 3/2008 | Belakovskiy | G06F 17/30616 |
| | | | 709/206 |
| 2008/0086471 A1 | 4/2008 | Ritter et al. | |
| 2008/0104042 A1 | 5/2008 | Gutt et al. | |
| 2008/0114729 A1 | 5/2008 | Raman et al. | |
| 2008/0195588 A1 | 8/2008 | Kim et al. | |
| 2009/0216805 A1 | 8/2009 | Coffman | |
| 2009/0228482 A1 | 9/2009 | Ye | |
| 2009/0287674 A1 | 11/2009 | Bouillet et al. | |
| 2009/0303546 A1 | 12/2009 | Silverbrook et al. | |
| 2010/0082677 A1 | 4/2010 | Athsani et al. | |
| 2010/0114950 A1 | 5/2010 | Raichur et al. | |
| 2010/0153364 A1 | 6/2010 | Kirby | |
| 2011/0047142 A1 | 2/2011 | Raichur et al. | |
| 2013/0339147 A1* | 12/2013 | Mysen | G06Q 30/0256 |
| | | | 705/14.54 |

OTHER PUBLICATIONS

Hearst, Marti A. et al., "Cat-a-Cone: An Interactive Interface for Specifying Searches and Viewing Retrieval Results using a Large Category Hierarchy", 1997, 1-10.

Maarek, Yoelle S., "WebCutter: a system for dynamic and tailorable site mapping", *Elsevier Science B.V.* 1997, 1-11.

Stauffer, Todd, "Using HTML 3.2", *Que Publishing, Second Edition* 1996, 53-58.

Baldonado, Michelle Q. W. et al., "SenseMaker: An Information-Exploration Interface Supporting the Contextual Evolution of a User's Interests", CHI 97 Human Factors in Computing Systems, Conference Proceedings, Mar. 22-27, 1997, 1-9.

Barrett, Rob et al., "How to Personalize the Web", CHI 97 Conference Proceedings, ACM, Mar. 22-27, 1997, 1-9.

Card, Stuart et al., "The WebBook and the Web Forager: An Information Workspace for the World-Wide Web", CHI 96 Conference Proceedings, ACM, Apr. 13-18, 1996, 1-8.

Chakrabarti, Soumen et al., "Automatic resource compilation by analyzing hyperlink structure and associated text", Computer Networks and ISDN Systems 30, 1998, 65-74.

Mackinlay, Jock D. et al., "An Organic User Interface for Searching Citation Links", CHI 95 Mosaic of Creativity, ACM, May 7-11, 1995, 1-8.

Miller, Robert et al., "SPHINX: A framework for creating personal, site-specific Web Crawlers", Computer Networks and ISDN Systems, 1998, 119-130.

Terveen, Loren et al., "Constructing, Organizing, and Visualizing Collections of Topically Related Web Resources", ACM Transactions on Computer-Human Interaction, vol. 6, No. 1, Mar. 1999, 67-94.

Wu, Harris et al., "Document Co-Organization in an Online Knowledge Community", CHI 2004, ACM, Apr. 24-29, 2004, pp. 1211-1214.

The Open Directory, "DMOZ Open Directory Project", www.dmoz.org, available via Internet Archive Wayback Machine, 2008.

\* cited by examiner

TARGETING USERS' INTERESTS WITH A DYNAMIC INDEX AND SEARCH ENGINE SERVER

CROSS-REFERENCE TO RELATED APPLICATIONS

This application is a continuation-in-part application of U.S. patent application Ser. No. 11/932,386, entitled Dynamic Index and Search Engine Server, to the present Applicants, filed on Oct. 31, 2007, which was a continuation-in-part application of U.S. patent application Ser. No. 09/641,031, entitled Dynamic Index and Search Engine Server, to the present Applicants, filed on Aug. 16, 2000, now U.S. Pat. No. 7,613,992, and that application claimed the benefit of the filing of U.S. Provisional Patent Application Ser. No. 60/149,322, entitled Dynamic Index and Search Engine Server, filed on Aug. 16, 1999, and the specifications thereof are incorporated herein by reference.

BACKGROUND OF THE INVENTION

Field of the Invention (Technical Field)

The present invention relates to Internet search indexes and engines.

Background Art

There are millions of World Wide Web ("web") sites on the Internet today, and so it is becoming increasingly difficult to index the available information quickly so that an individual can easily find the current and complete information (web sites) in which they have interest. Many search engines and search indexes on the web (hereafter web indexes) are simply too large to be useful. Sifting through the thousands of web sites that come from a single search or under a single topic (in an index) is often cumbersome and unfruitful.

The problem is two-fold. First, search indexes are very broad. Most people are not interested in every topic on the web; instead they are only interested in a small portion of the many topics that exist. Web users would like to have a web index that only encompasses their topics or subtopics of interest. But creating a customized web index is very time consuming and can be very expensive. Therefore, most people wade through many, many other topics to get to the few topics in which they have interest.

The second problem is with search engines on the web. The web is typically searched by keyword searches of the entire sampling of the web that has been indexed by any given search engine. These searches usually bring up a very large number of sites that have nothing to do with what the user intends to find. For example, someone searching for the poems of Robert Frost may simply type in the poet's name. The result, however, is often unproductive because most search engines can only search for the exact word or words and cannot put the word into context. Therefore the search results for "frost" may include the word "frost" in the wrong context such as in gardening tips. Another example is that a search for web sites about basketball courts may result in the word "court" being taken out of context and the searcher gets not only basketball courts (and other types of sports courts), but also get the supreme court, the court of appeals, etc.

The present invention provides a solution to the problems noted above by permitting individuals to create and organize search indexes specific to their needs.

SUMMARY OF THE INVENTION (DISCLOSURE OF THE INVENTION)

The present invention is of a method (and concomitant apparatus and computer-readable medium comprising software) for providing personalized advertising to users of internet web pages, comprising: a) providing an index server maintaining a dynamic index to internet web pages and employing a hierarchical plurality of topic categories whose contents are maintained and updated by the index server; b) permitting a user to specify any subset of the plurality of topic categories; and c) serving to the user an advertisement based upon the subset specified by the user. In the preferred embodiment, the invention, at request of the user, executes a search of the index server in any category of the subset but only of categories in the subset, more preferably wherein the serving step comprises serving an advertisement additionally based upon categories in which the search produced matches, and most preferably wherein the serving step comprises serving an advertisement additionally based upon categories browsed by the user. Serving can comprise serving an advertisement additionally based upon categories browsed by the user. The user can propose addition of an internet web page to the index server in conjunction with one or more categories of the subset and automatically adding the proposed page to the index server wherein the user can search the proposed page via the link information and wherein initially other users will not search the proposed page even if searching the proposed one or more categories. The user can rename or rearrange hierarchicalization of one or more categories of the subset. Serving can additionally be based upon topic categories matched in searches of the index by the user.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Figure 1:
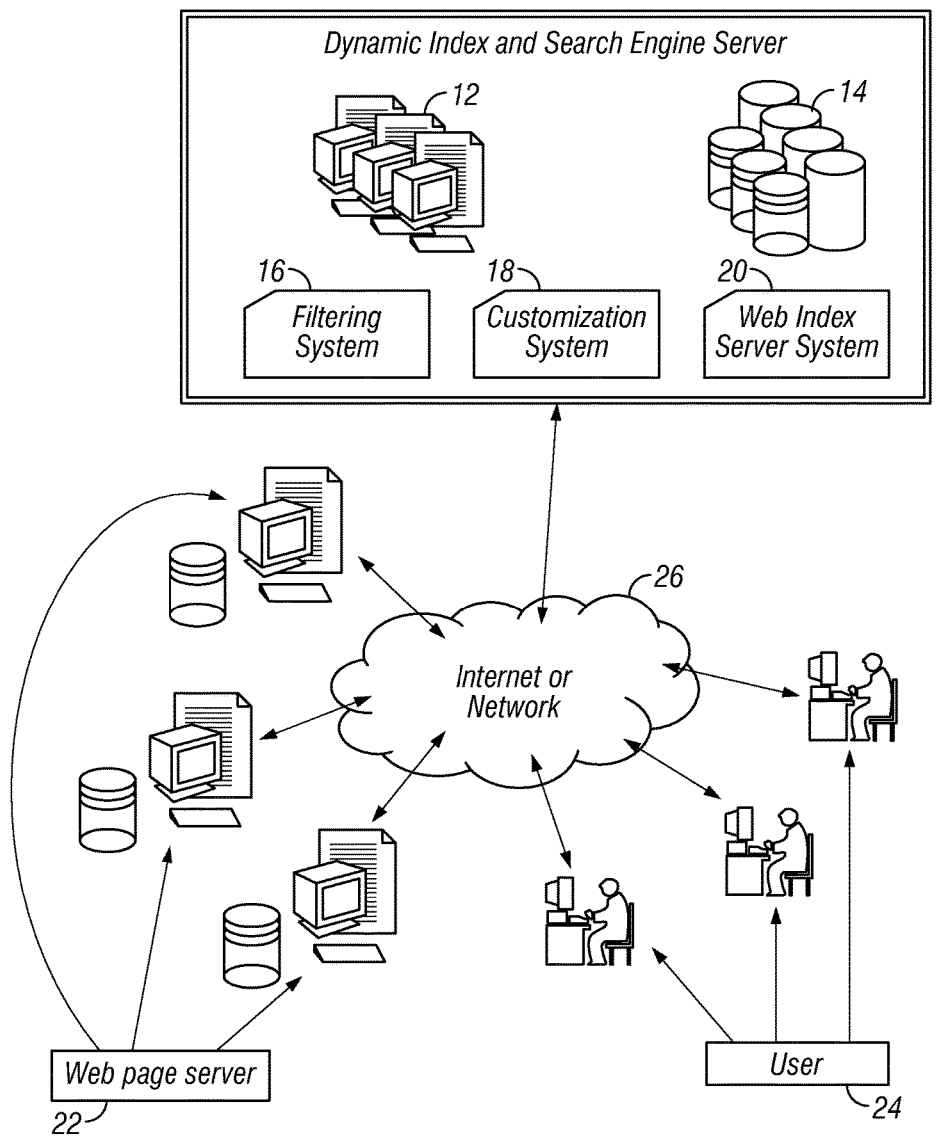
FIG. 1 is a general block diagram of the preferred method and apparatus of the invention.

Best Modes for Carrying Out the Invention

The present invention is of a server method and apparatus to allow anyone to put a web index on their web site without having to update, store, check or catalogue any of the link information themselves, yet still allowing them to add web sites to the index. The web site owner can customize several aspects of the look and feel of the web index, then choose a subset of the topics available or choose all topics.

Take as an example a young girl maintaining a personal web site. The present invention allows her or her parents to set up a customized index on her web site. She might choose to have her topics be:

Barbie® and Friends
Toys
Games

With the present invention, when she browses using her web site she does not have to wade through other topics to get to her three topics of choice. Furthermore, because the present invention will exclude all other topics from her customized web index, a search of her index will provide her a more useable set of results—only on her topics. She can search for the words "Barbie" or "Ken," and because the search would only be on the web sites included in her particular topics, she would get very meaningful results.

The web site owner can also arrange the topics in a personalized hierarchy or keep the default hierarchy. For example, if someone included a Sports topic on their web index, they could arrange the links within Sports and even change the name of the topics. As just one example, they could take a sports topic with subtopics of Baseball, Basketball, Cheerleading, Cricket, Curling, Field Hockey, Football, Hockey, Lacrosse and Polo as follows:

Sports
  Baseball
  Basketball
  Cheerleading
  Cricket
  Curling
  Field Hockey
  Football
  Hockey
  Lacrosse
  Polo and rearrange it to make some of the subtopics main links on the resulting customized web index, such as follows:

Baseball
Basketball—The Best Sport!!
Hockey
Football
Other Sports
  Cheerleading
  Cricket
  Curling
  Field Hockey
  Lacrosse
  Polo
  Rugby This example illustrates that not only can the web site owner change the hierarchy, but also change the names of the subtopics, making a truly unique web index. This is just one example of how the hierarchy and topic names could be changed. The possibilities are, as is readily understood, endless.

In order to obtain a customized web index for their web site, a web site owner would connect to the Dynamic Index and Search Engine Server ("DISE Server") of the invention to set up their custom index. This would preferably include:

Setting the look and feel of the web index
Choosing the topics to be included
Rearranging topics (changing hierarchy)
Adding new topics
Renaming existing topics After the web site owner has customized the DISE Server for their web site, they are provided a unique DISE Server Connector ("DSC") to place on their web site. The DSC is a gateway to the DISE Server that connects the web site to the DISE Server so that when someone accesses a web page containing the DSC, the DISE Server is accessed and the customized information is included on the web page.

A very important part of this invention is that the web index is dynamically included on the web page. Therefore, the DISE Server is able to update, store, check and catalogue the link information and any changes are instantaneously seen on the web indexes. In this way the web site owner does not have to update his links; he does not have to make sure they are still valid. The DISE Server handles all the work for him. However, the web site owner can add links to his web index.

Everyone with a DISE Server customized web index on their web site will be able to request to add links to their web index. This request will include information about the link as well as the suggested topic in which to include the link. When the DISE Server receives the request, it puts the request through a series of filters to determine if the link is valid. If a link is deemed valid, it is added to the requester's web page. The link request is then sent through a second filtering process to see if it should be added to the global DISE Server index. If this second filtering process determines that the link should be added to the global index (DISE Server), the link will be added and, therefore, will automatically be added to all web indexes that contain the topic.

In this manner the web site owner is spared the expense and time it takes to maintain a web index while still being able to dynamically add links to their web index.

Furthermore, by allowing all web site owners to add to the global index, each topic will be more complete. The web site owners can update the topics of interest to them, as they use their own customized index, and every other user will benefit by having the global information in each topic updated much faster and more efficiently.

The present invention allows for an unlimited number of new, yet completely distinct, indexes, which can be created by any number of individuals, companies, groups and organizations. In other words, this technology enables any individual, company or organization to put up their own web index—each with its own look, feel, and method of organizing and prioritizing links. Furthermore, when someone does a keyword search on a web site with a DISE Server customized web index, they are only searching the subset of web sites that are included in this particular web index, and not the entire web. This creates much more relevant search results.

It is important to note that this invention works with any search technology available at this time or invented in the future. It is not particularly relevant to the invention how web sites are searched, but rather that only the customized subset is searched.

A generalized networked computer system consistent with the present invention is shown in FIG. 1. Web page servers (22) are attached to the Internet (26). These servers contain web pages that will be linked from a web index as well as web pages that will utilize the DISE Server to have dynamic web indexes. User computer systems (24) capable of executing a Web browser are coupled logically through a network (26), such as the Internet, to any number of web page servers (22).

The present invention preferably encompasses any number of logical and physical computer systems (12) with access to one or more individual databases (14), a database management system (14), a system to implement the customization (18), a system to add and filter links (16), and a system to serve the web indexes dynamically (20). The present invention includes a global index of web pages and one or more methods of searching those web pages. The present invention also includes a default topic structure or hierarchy to contain the global index. Each topic will contain one or more subtopics and one or more links to external, relevant web pages (hereafter external links) under that topic.

Figure 2:
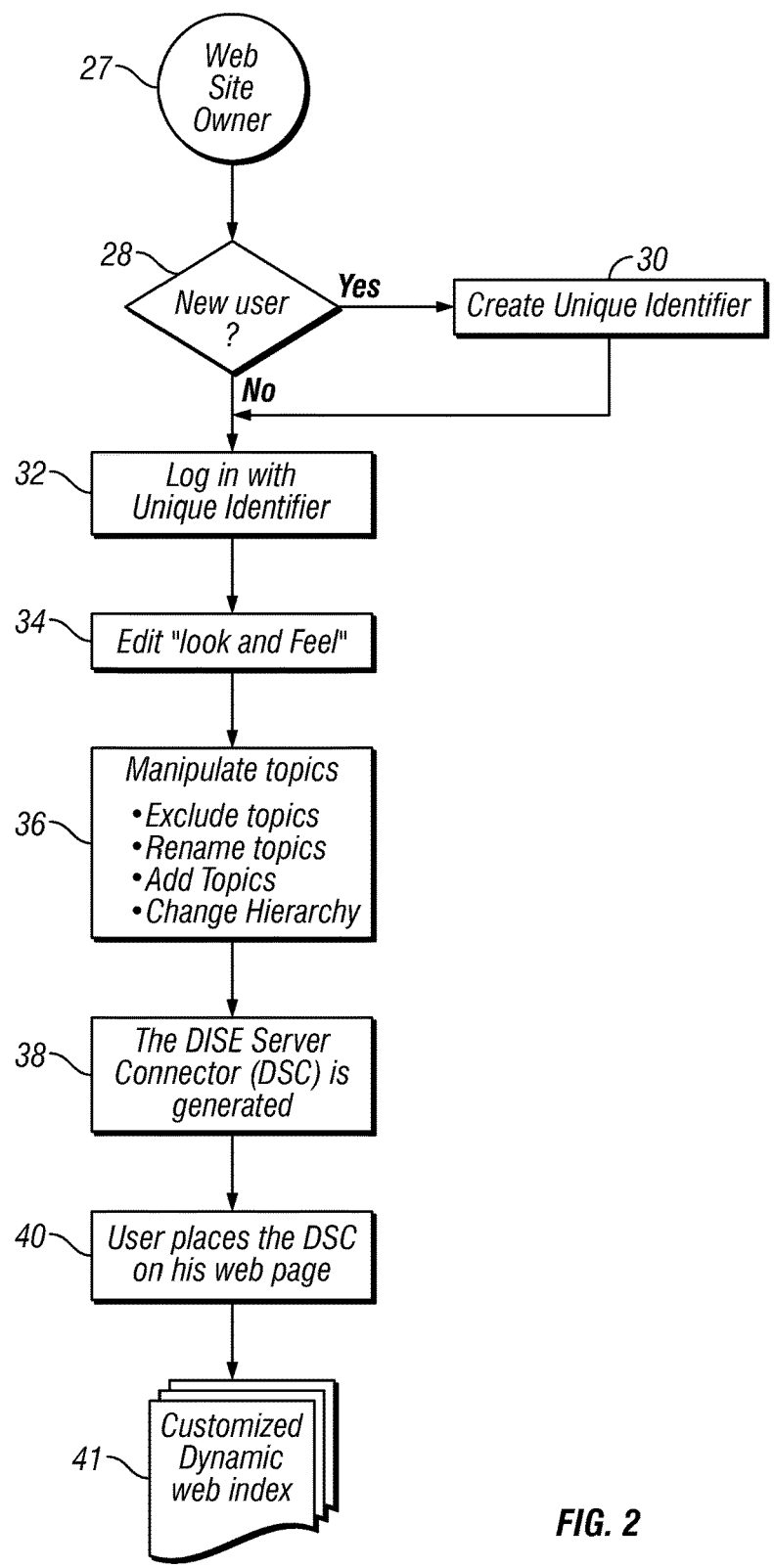
FIG. 2 is a block diagram of the preferred method and apparatus of the customization of web indexes.

When an individual or company (web site owner) chooses to use the DISE Server to incorporate a web index on their web site, they must first set up their customization. FIG. 2 is a generalized flowchart of the process of customizing an individual web index. In the preferred embodiment, the web site owner (27) must set up a unique account in order to store and retrieve the web site owner's web index setup. If he has not yet set up an account, he will need to go through the process to obtain a unique identifier (30). He can then login (32) and customize many aspects of the look and feel (34), including, but not limited to fonts (size, color, link color, visited link color, etc.), number of columns on the home page and on subsequent pages, whether subtopics will appear on the home page, etc. The web site owner can then completely customize the topic, including the hierarchy and the topic names (36).

Figure 4:
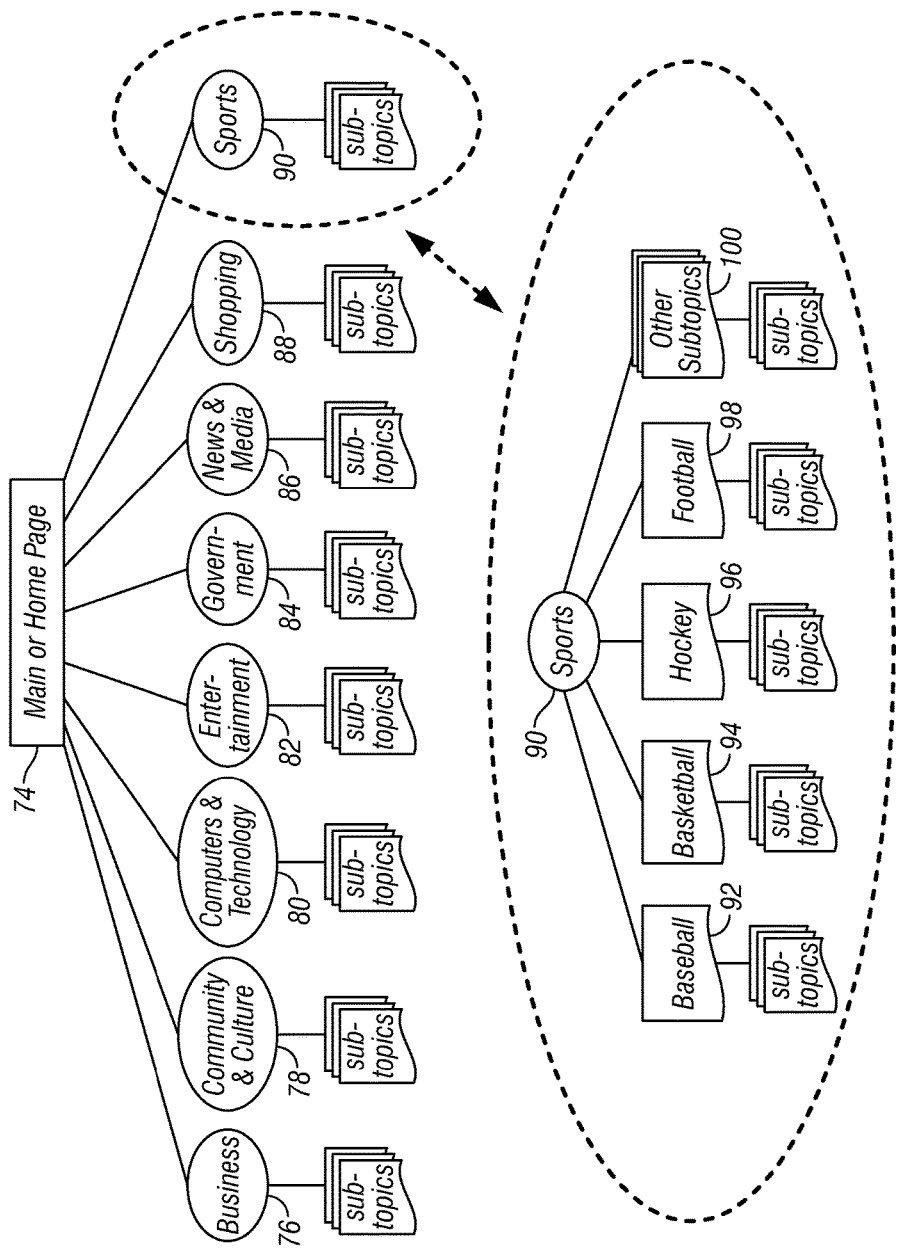
FIG. 4 is a block diagram of a general web index.

FIGS. 4-7 illustrate the customization of a web index. FIG. 4 is a general block diagram of a possible web index. There is a main page or home page (74) with link to topics (76, 78, 80, 82, 84, 86, 88 and 90). These subtopics in turn have their own subtopics. One such set of sub-subtopics is shown in FIG. 4 (92, 94, 96, 98, 100).

Figure 5:
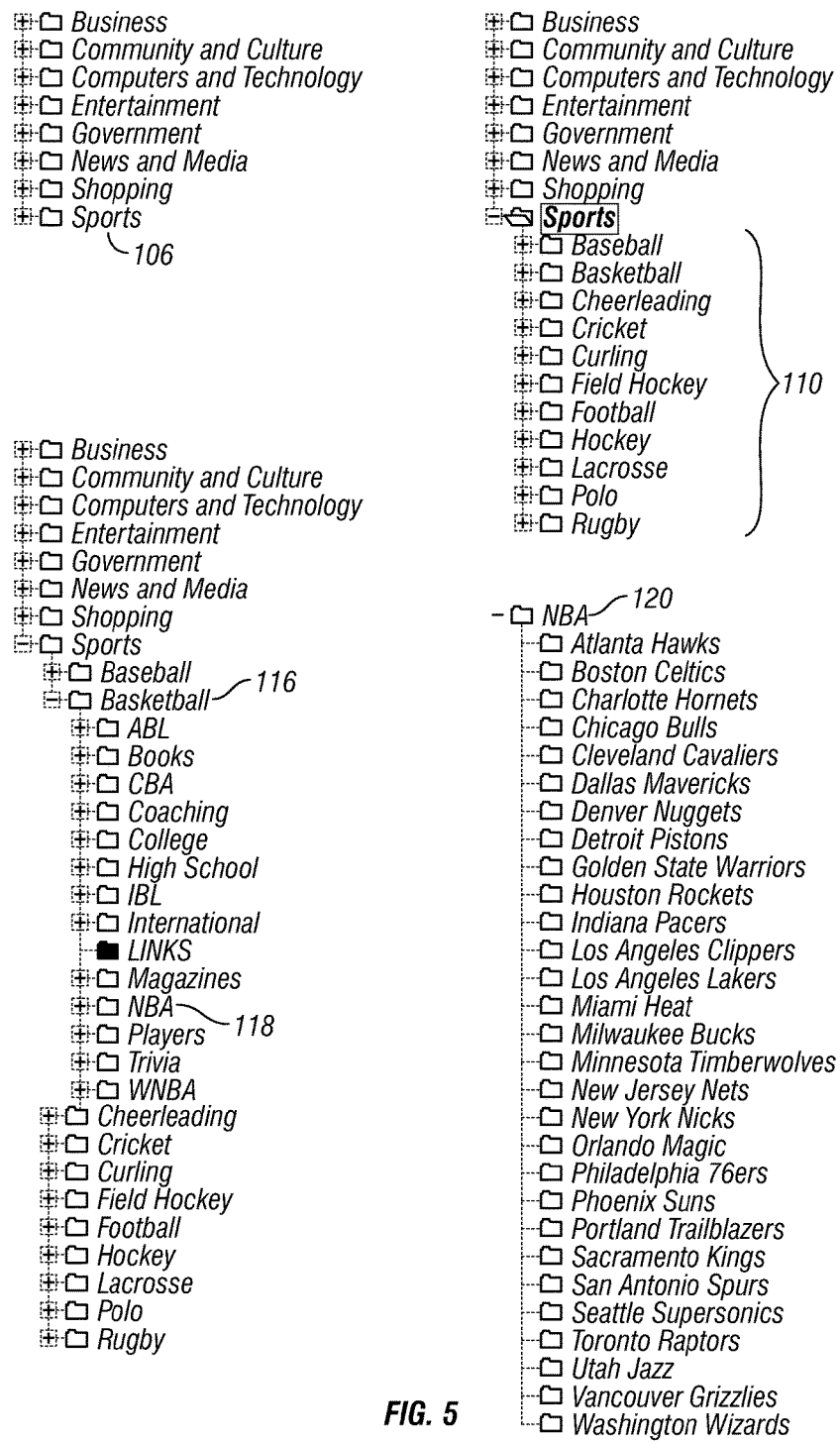
FIG. 5 is a more specific block diagram of the preferred method and apparatus of viewing a general web index.

FIG. 5 shows an example of how the web site owner might browse through the topics. In the preferred embodiment the web site owner is able to customize the topics by manipulating folders, as on computer, that represent the topics and subtopics. In this example the sports topic (106) is clicked on to reveal its subtopics (110). Under the sports topic there are many other subtopics including basketball (116). Under Basketball there are several subtopics, including NBA (118). When NBA is clicked on, it is seen that there are also subtopics under NBA (120).

Figure 6:
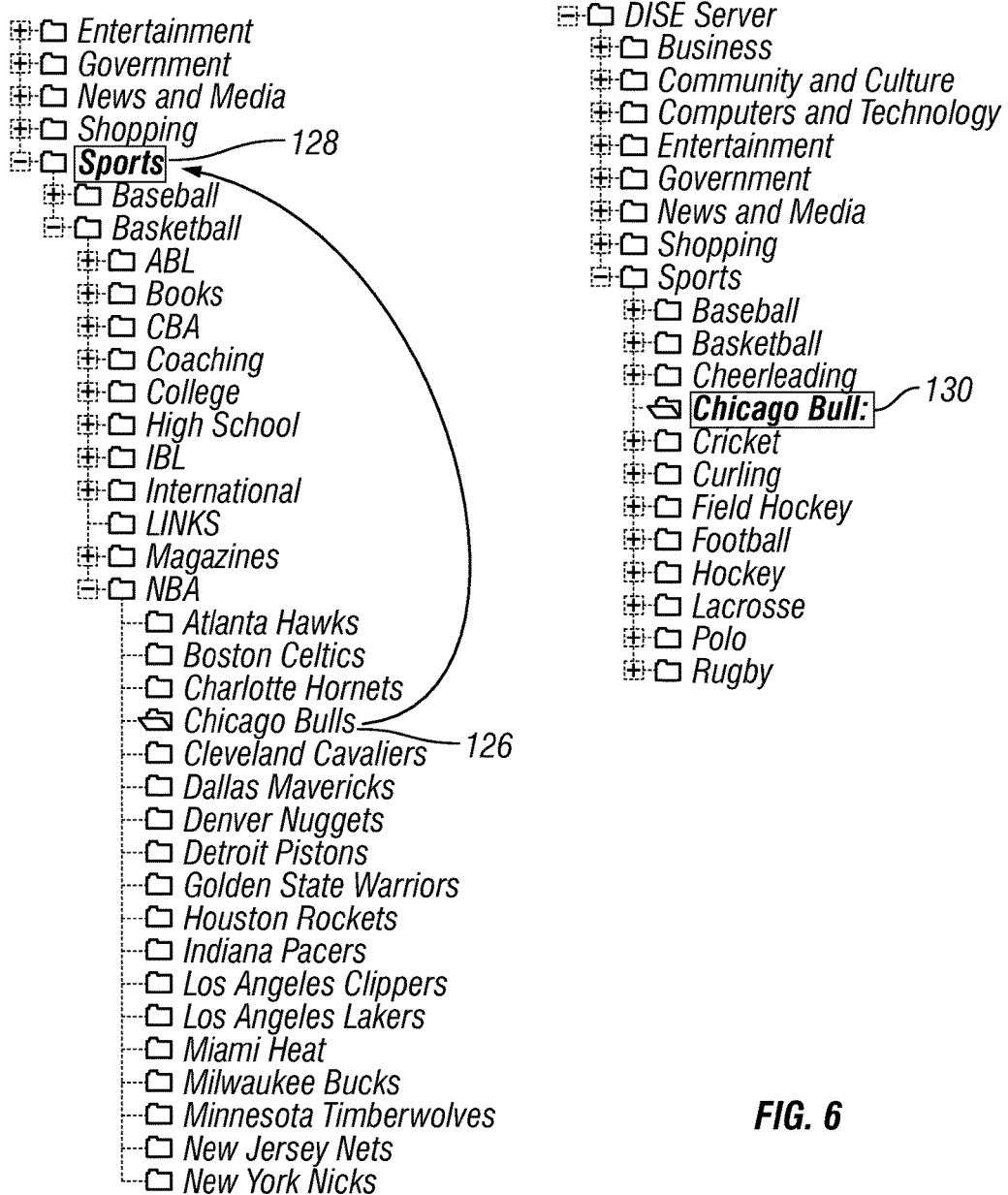
FIG. 6 is a block diagram of an example of changing the topical hierarchy.

To customize his web index, the web site owner will be able to move any subtopic to a different level or under a different topic. FIG. 6 shows how a subtopic might be clicked and dragged to a new topic. This is very much the same way file and folders are typically moved around on computers today. Specifically, in this example the "Chicago Bulls" subtopic (126) is moved above its current parent topic of basketball directly into the Sports topic (128), so that the topic "Chicago Bulls" is now a subtopic of Sports (130).

Figure 7:
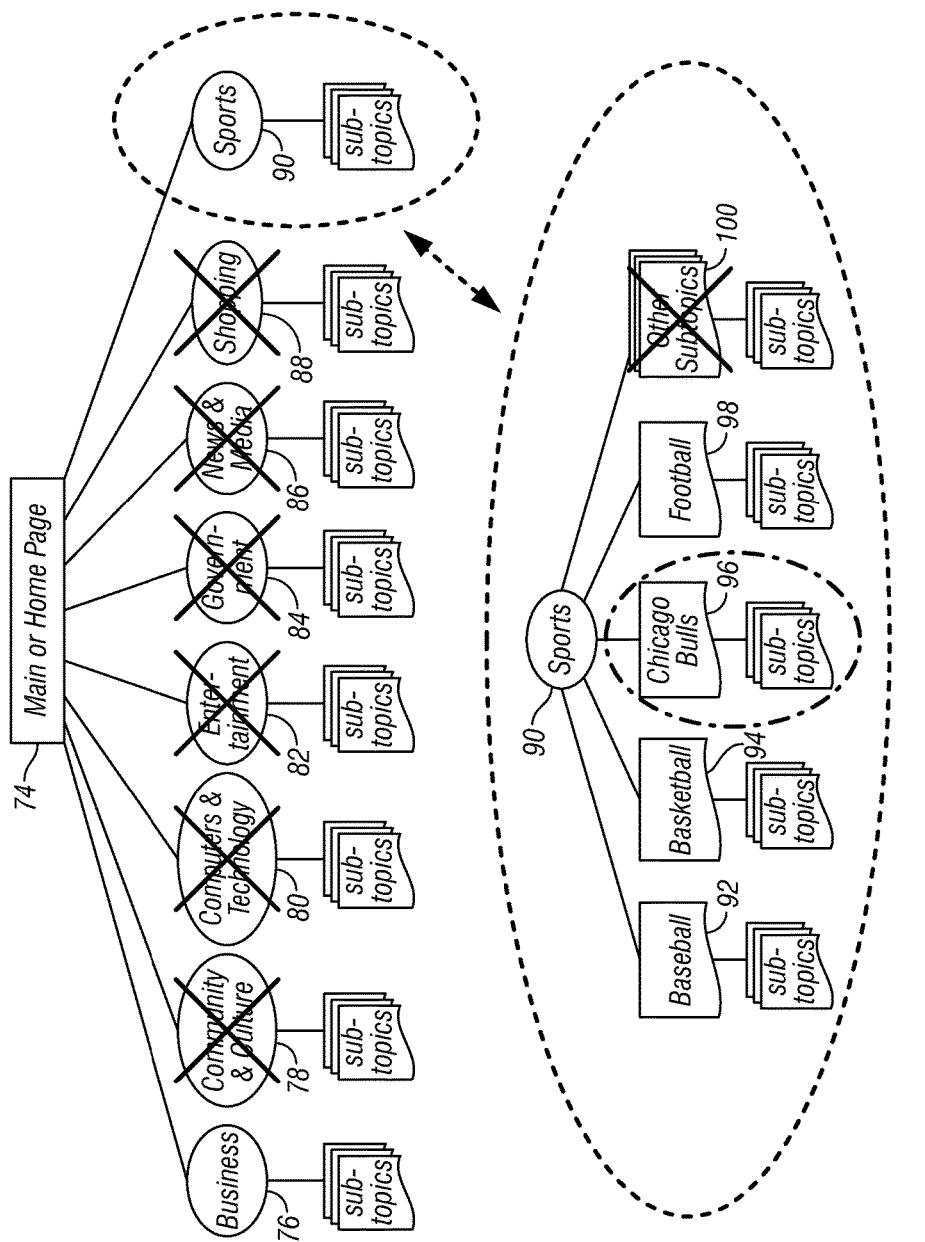
FIG. 7 is a block diagram of the preferred method and apparatus for excluding and setting up topics to customize.
Figure 8:
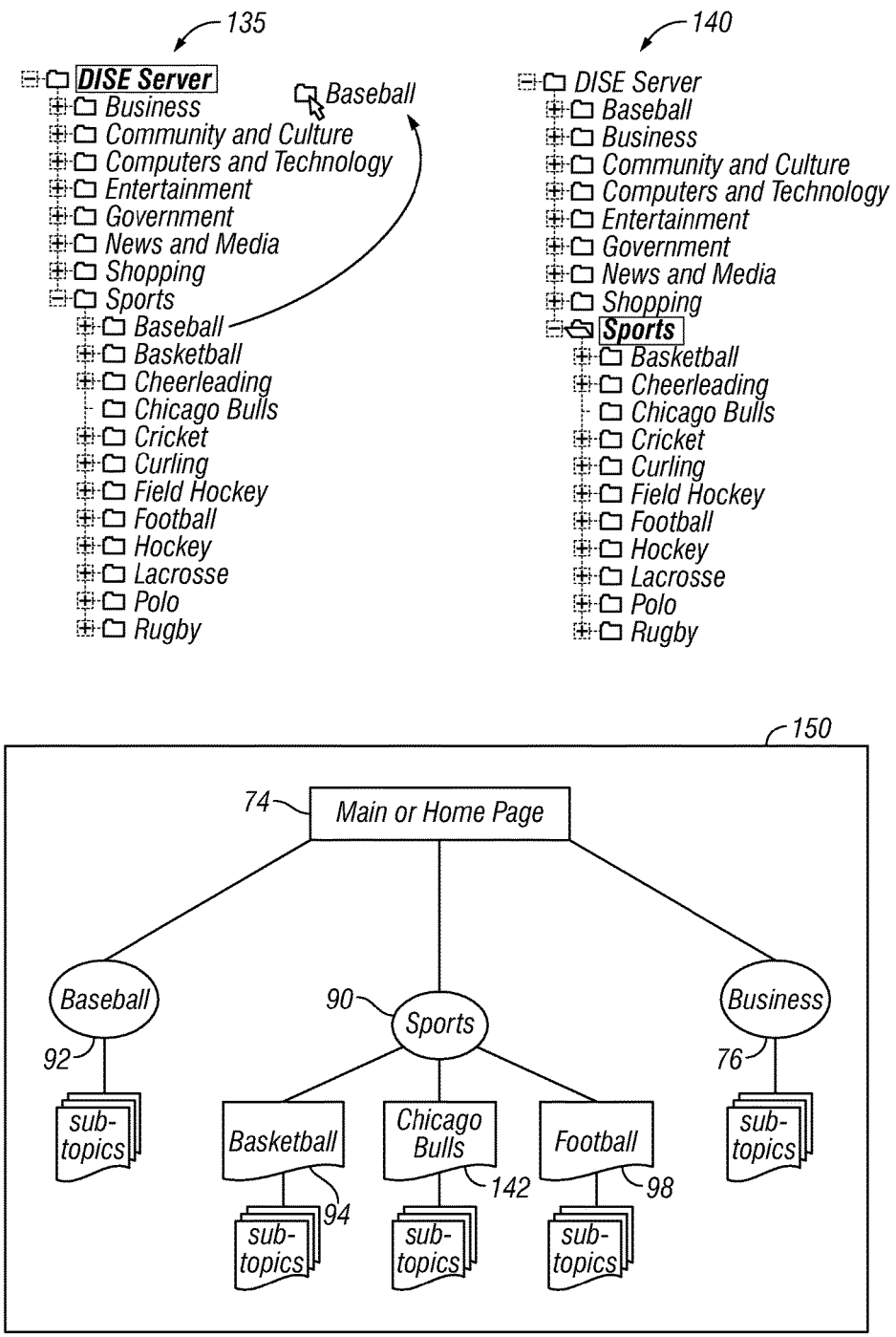
FIG. 8 is a block diagram illustrating the results of the operation of FIG. 7.

To specify topics that web user does not want included, he can simply mark them to be taken off. FIG. 7 illustrates this feature of the invention. The subtopics that are not to be included are simply "turned off" (78, 80, 82, 84, 86, 88, 100). FIG. 8 shows how this appears to the user in the preferred embodiment. The topics that turned off are "ghosted." In other words, the folder representing those topics is changed to a different, much lighter color (135). To further show the customization of the topical hierarchy, FIG. 8 shows how the "Baseball" subtopic might be moved from "Sports" to be a top-level topic (135, 140). FIG. 8 then shows how the hierarchy might look to the user (150). In this example, the main topics are Baseball (92), Sports (90), and Business (76). Other customization of the topics can also be performed, including changing the name of any topic and creating new topics.

In the preferred embodiment, the external links that fall under any topic will stay under that topic at all times, whether the topic is moved or renamed, although provision for the external links to be moved under different topics certainly falls within the scope of the invention.

After the web site owner has customized the topics, his preferences are stored. In the preferred embodiment, the preferences are stored in a database, although any reasonable storage method would fall within the scope of the invention.

The present invention then generates the unique DISE server connector ("DSC") for the web site owner (38). The DSC is source code that is placed on the web site (40) to add the dynamic index to the site. This DSC source code could be implemented in HTML, XML, SGML, Java, ASP, or any other feasible source code options for web sites. The preferred embodiment has many types of DSC source code options to accommodate the many web site hosting environments available now or in the future.

Individuals and companies host their web sites on one or more web servers. These web servers store the individual web pages that make up the web sites along with any number of programs, database, etc., which encompass the web site. Since web servers vary so widely, and the technology is constantly changing, it is difficult to choose one particular implementation. The key to the DSC is that it will connect to the present invention over the Internet and dynamically include language that represents the dynamic index.

In the preferred embodiment, when the index is placed on the web page some other information and features appear on the page as well (herein called other information). This other information preferably includes:

1. Banner advertisements or other advertisements;
2. A way to add new links;
3. A copyright statement;
4. An ownership statement;
5. Links to a web page containing information about the present invention;
6. A search box enabling a search of the customized index or the entire web; and
7. A way to reconfigure the web index.

In the preferred embodiment, the banner advertisements are optional, but there are preferably other mandatory information that must be included with the web index.

Once the web site owner places the DSC on his web page, the code will be activated when any web browser views the web page. When a web user (24) views the web page, the unique customized web index and other information for that web page will appear on the web page dynamically (41).

At any time the web site owner can reconfigure his settings of the present invention, allowing him to change his customized web index. In the preferred embodiment, a new DSC is not be required for every reconfiguration, although requiring that the DSC be changed after each reconfiguration is within the scope of the present invention.

Figure 3:
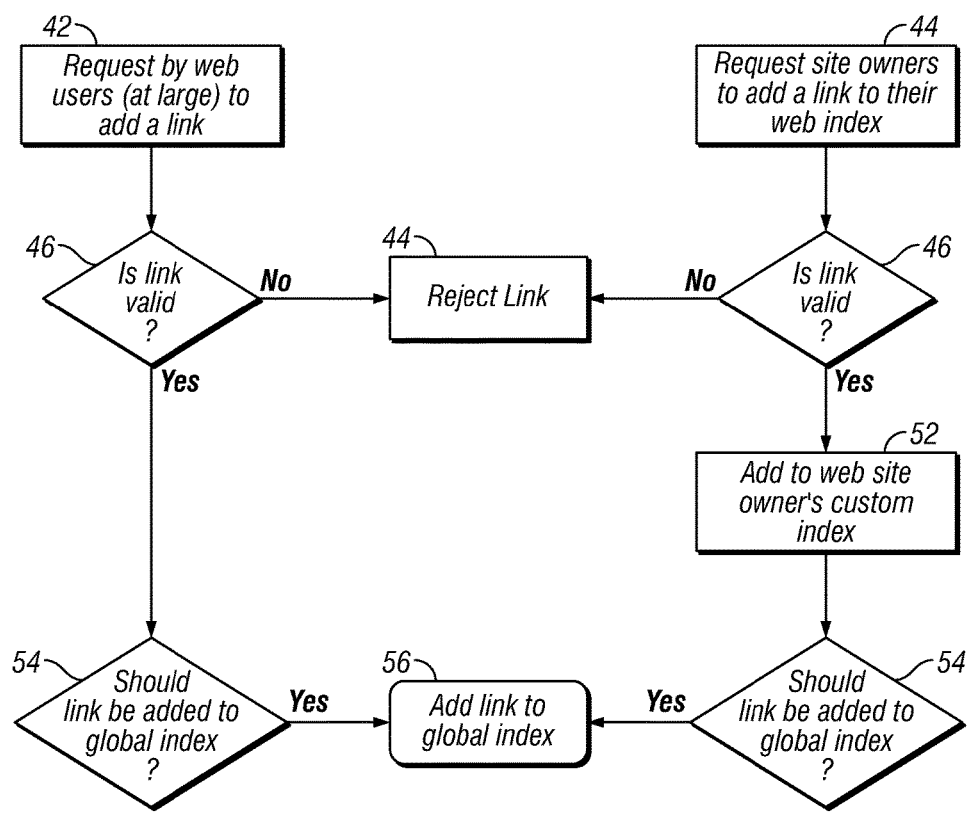
FIG. 3 is a block diagram of the preferred method and apparatus of the system to add and filter links.

In the preferred embodiment, anyone who uses any of the customized web indexes can suggest links to be added to the web index. These suggestions include the suggested link, the suggested title of the link the suggested link description and the topic in which to include the link. FIG. 3 shows a generalized block diagram of user-added links to the system. Before one of the "at-large" link requests (42) are incorporated into the global index, the link suggestions are preferably filtered through two filtering processes: 1) a filtering process to determine whether the link is valid (46); and 2) a filtering process to determine whether the link should be added to the global index (54).

The first filtering process, to test whether the link is valid (46), preferably includes, but is not necessarily limited to:
 1. Checking if the link is a valid web page;
 2. Making sure that the same link has not already been added to the specified topic; and
 3. Checking that the title of the link of words used to describe the link meet certain criteria (e.g., no profanity, etc.)

The second filtering process to determine whether the link should be added to the global index (54) preferably includes, but is not necessarily limited to:
 1. Checking to make sure that the suggested link is appropriate for the topic;
 2. Checking to make sure that the proposed description and title of the link are appropriate; and
 3. Checking to make sure that the proposed description and title of the link are descriptive of the contents of the link.

However, the web site owner who has included a customized web index on his web site will have more choices. He can add a link to his index dynamically. If the web site owner suggests a link (44), his request is only put through the first filtering process to test that the link is valid (46) before it is included on his web site. If the link is deemed valid then the link is added to the requester's web index (52). In the preferred embodiment the filtering process is done electronically so that the link will be added to the requesting web site owner's web site immediately.

Furthermore, every link suggestion posted by a web site owner is preferably also being sent through the second filtering process to determine whether the link should be added to the global index (54). In this manner, as each individual updates his or her web index, the global web index is updated (56) as well allowing for a much more complete index than could otherwise be accomplished.

It is important to note that under the present invention it is also possible for the web site owner to exclude individual links from his web page. This feature is not included in the preferred embodiment because of the complexity of keeping track of whether one link should be included in any number of web sites.

A novel and additional feature of the invention is that the customized index can be employed as an inclusion filter for web content. Many people use filters on the Internet to disallow browsing of inappropriate web sites. Many people and businesses use filters so that no one can browse pornography or other web sites deemed inappropriate. With the present invention, a user can set up their customized web index and then employ that index as an inclusion filter set into place so that the user can only browse web sites that are included in the index. A good example of this is a filter for use by a child. Many web filters exist for children and, in fact, many of the largest Internet Service Providers (ISPs) have child filters. But if a user uses one of these established child filters then they are letting someone else decide which web sites are appropriate for their children. Instead, with the present invention, the parent can use the invention to customize a web index, excluding all the topics that they deem inappropriate for their children, and then use it as an inclusion filter. The children would then only be able to view web pages that were included in the topics of the index customized by the parent.

Targeting a User's Interests

The DISE server technology allows for a unique opportunity to understand the interests of users on the internet.

One can combine 1) the information one obtains from the user customizing his or her index, 2) the information one obtains when the user searches, specifically the categories of the user's search results, and 3) the information for the categories that the user browses, to understand a user's interests. One can then aggregate this data to obtain a level of interest for each user in each category.

Information from Customizing the User's Index

As each user sets up his or her index, one can store information about their interests. With the DISE Server the user can customize his or her index by, including but not limited to:
 removing categories,
 adding categories,
 renaming categories,
 changing the hierarchy of categories,
 changing the description of any category,
 removing links,
 adding links,
 renaming links,
 changing the hierarchy of links, and
 changing the description of any link.
 Adding a picture to the link information (which could include a thumbnail image or an icon)

Each of these customization steps is considered a "transaction." Through this customization, one can assign a value to the user's interest in each category. The preferred embodiment is a rating system for the customization that employs values from 0 to 1 called the "customization value" (0=no interest, 1=Extremely interested).

If a user removes a category from his or her index, then one knows that the user is not interested in the category and the user would have a 0 customization value for that category. For example, if a user removes the "Cheerleading" category, one knows that they are not interested in Cheerleading. The user would then have a zero (0) "customization value" for his or her interest in Cheerleading.

If a user includes a category in their index, then one can ascertain his or her interest by the time and effort they take customizing the category. One can then assign a Customization Value to the user's interest in the category. If the user includes a category, but does no customization whatsoever, the user is assigned a Customization Value of 0.05 in the category (this is the default value).

As each user customizes his or her index, his or her interest in the category is given a higher Customization Value based on the how much customization they do. In the preferred embodiment, as the user customizes a category, one assigns a percentage to each category according to the percentage of transactions for that category. For example, a user may do the following number of customization transactions in the following categories:
- business—30 transactions
  - investing—0 transactions
  - management—30 transactions
- news—40 transactions
  - newspapers—20 transactions
  - television—20 transactions
- sports—120 transactions
  - basketball—40 transactions
  - football—80 transactions In this example the user has performed a total of 190 transactions. In the "Sports" category has the most customization transactions at 120, so in the sports category this user has a Customization Value of:

120/190=0.6316 or 63.16%

This user would have the following customization values
- business—30 transactions→Customization Value=30/190=0.1579 or 15.79%
  - investing—0 transactions→Customization Value=0.05 (default value) or 5%
  - management—30 transactions→Customization Value 30/190=0.1579 or 15.79%
- news—40 transactions→Customization Value=40/190=0.2105 or 21.05%
  - newspapers—20 transactions→Customization Value=20/190=0.1053 or 10.53%
  - television—20 transactions→Customization Value=20/190=0.1053 or 10.53%
- sports—120 transactions→Customization Value=120/190=0.6316 or 63.16%
  - basketball—40 transactions→Customization Value=40/190=0.2105 or 21.05%
  - football—80 transactions→Customization Value=80/190=0.4211 or 42.11%

One can use these percentages of transactions as the Customization Value for each category for the user. One can then combine this information with the information one obtains from the user's searches and the categories that the user browses to get a value for the user's interest in every category.

Information from the User's Search Results

When the user searches a DISE index, the results are categorized by their topic. One can use the information on the search results themselves to understand the user's interests. For example, if a user does a significant number of searches that yield results in the sports topic, this shows a heightened interest in sports.

As users search their index and other user's indexes, one preferably assigns a percentage to each category that the search results are in. One can then aggregate this data to have a complete picture of the categories that the user searches.

For example, a user might search his or her index (or other users' indexes) and the results would come up in the following percentages:
- business 30%
  - investing 25%
  - management 5%
- news 20%
  - newspapers 18%
  - television 2%
- sports 50%
  - basketball 10%
  - football 40%
    - NFL football 39%
    - college football 1%

One uses the percentage of search results for each category for the user's "search value" for each category. One can then combine this information with the information obtained from the user's customization of the categories and the information about the categories that the user browses to get a value for the user's interest in every category.

Information from the Categories that the User Browses

As a user browses his or her index, one can get a value for the user's interest in each category. For example, a user might browse his or her index in the following percentages:
- business 20%
  - investing 15%
  - management 5%
- news 35%
  - newspapers 25%
  - television 10%
- sports 45%
  - basketball 10%
  - football 35%
    - NFL football 30%
    - college football 5%

We use the percentage of browsing for each category of their personal index as the user's "personal browsing value" for each category. For example, if a user browses the business topic a significant percentage of the time, this shows a heightened interest in business.

Similarly, as a user browses other people's indexes, one can get another value for the user's interest in each category. A user may browse other people's index in the following percentages
- business 25%
  - investing 10%
  - management 15%
- news 25%
  - newspapers 24%
  - television 1%
- sports 50%
  - basketball 5%
  - football 45%
    - NFL football 30%
    - college football 5%

One uses the percentage of browsing for each category for other people's indexes as "other browsing value" for each category.

One can then take an average of the "personal browsing value" and the "other browsing value" to get the user's "browsing value" for each category. In the preferred embodiment, the personal browsing value and other browsing value will be given the same weight (averaged together) but other combinations of these values fall under the scope of this invention.

Summary of Targeting the User's Interests

In the preferred embodiment, one preferably takes the average of the Customization Value (a value between 0 and 1), the Search Value (a value between 0 and 1) and the Browse Value (a value between 0 and 1) to get an initial "Interest Value" of each category for the user. In other words the user is assigned the initial value in each category of:

$$((\text{Customization Value} \times 100) + (\text{Search Value} \times 100) + (\text{browsing value} \times 100))/3$$

This is the Interest Value Formula. One ends up with a value between 0 and 100 for the initial Interest Value of the user in each category. This Interest Value will constantly change as the user customizes their index, searches their index and other user's indexes and browses their index and other user's indexes.

Using these three pieces of information, coupled with other information about the user, will allow one to get a value for the user's interest in every category.

It is important to note that the Customization Value calculation, the Search Value Calculation, the Browsing Value calculation and the Interest Value Formula can change over time. And other factors can be combined with these values to target a user's interests.

This category Interest Value information for each user can be used in a number of ways including selling the information to other companies and targeting advertising to each user based on their interest.

Not only can one use this information to serve advertisements to the user as they search and browse DISE indexes, but one can also use it in an advertisement platform that is engaged even when the user is not looking at a DISE index. One can provide a service to web sites around the Internet to make them "DISE aware" so that when a DISE user goes to a web site, like CNN.com, or ESPN.com as they browse the web site and see the content on the web site, the user is served advertisements based on their Interest Value of the various categories.

For example, a DISE user might be reading news articles on CNN.com (without any sports content on the page). From the Interest Value one might know the user has a strong interest in Tennis. Based on this knowledge and their Interest Values, one can serve them advertisements for tennis equipment even though they are not browsing tennis content.

Furthermore, as one serves advertising to the user one preferably uses the information about what advertisements they click on to change the formula of the Interest Value to maximize ad revenue from the each user. This can be done by adding another value (e.g., the advertising value for each category) to the Interest Value Formula or by changing the Interest Value Formula in another way to yield the maximum advertising dollars from each user.

Exclusions and Preferred Web Sites

Users can specify a list of web sites that they want excluded from their index in one or more categories. The user would specify a web site URL and where they want the web site excluded—from all categories or from selected categories. These web sites will be excluded (removed) from their index based on their specifications. If a new page is added to the Master Index from an excluded web site in a category that the user has excluded it from, it will not be added to the user index in that category.

For example, a user might want to exclude the web site Walmart.com from every category in their index, in which case the links to Walmart.com and its subpages would be removed from the user's index in every category the links are in. Furthermore, should a Walmart.com web page be added to the Master Index in any category, it will not be added to the user's index.

A user can also have a list of preferred web sites. For each preferred web site they can specify any one of a list of special behaviors for the links to that web site that appear in the user's index:

The link to the preferred web site (wherever it appears) can have a different look and feel than the other links including, but not limited to, have a box around the link, having a different font size or font color, etc.
  Add a picture or icon next to the link to the preferred web site (for example an icon image that says "Preferred").
  Have the link to the preferred web site appear on the top of any category that it is in.
  Have a link to the preferred web site appear at the top of EVERY category.

The user can also specify a special behavior for a preferred web site that appears in the search results as follows The link to the preferred web site (wherever it appears in the search results) can have a different look and feel than the other links including, but not limited to, have a box around the link, having a different font size or font color, etc.
  A picture or icon can be added next to the link to the preferred web site (for example an icon that says "Preferred").
  If the preferred web site appears in the search result, the user can have it appear at the top of the results. In the preferred embodiment, the preferred web site will then be set apart from the natural search results visually—to make a clear separation from a natural result to an unnaturally elevated result—to maintain the integrity of the natural search results.

Ordering and Popularity Value

Users can change the order of the links in any category. Where they move a link determines the value that they place on a link.

If a DISE user raises a link to a web site to the top of a category, they are placing a positive value on the link. If a user deletes a link from a category they are placing a negative value on a link. If the user moves a link to the bottom of a category, they are placing a negative value on the link.

In this manner, the DISE server can calculate the "Link Popularity Value for the Category" of every link in a category.

In the preferred embodiment, every link starts with a Link Popularity Value for the Category of zero (0). If a link is deleted from a category by the user, first the link will go through a filtering process to see if it should be deleted from the Master Index. If the link is deleted from the Master Index then the Link Popularity Value for the Category is a moot point. If the link is not deleted from the Master Index, then the link has 2 points deducted from its Link Popularity Value for the Category for each user that deletes the link. If a user permanently moves the link to the bottom of a category, then the link has 1 point deducted from its Link Popularity Value for the Category.

If a user moves a link or links to the top of a category, then the links have a value between 1 and 2 points added to their Link Popularity Value for the Category depending on where they have put the link.

Users can place as many links at the top of the category as they would like, in any order they would like. If a user places only one link at the top of the category, then that link has 2 points added to its Link Popularity Value for the Category. If the user has more than one link positioned at the top of the category, then the top most link has 2 points added to the Link Popularity Value for the Category and the bottom link (of the user's top links) has one point added to the Link Popularity Value for the Category. All the links in between the top most link and the bottom or last of the top links are given a value between the two based on position.

To determine the Link Popularity Value for the Category when a user moves more than two links to the top of a category, we first calculate an increment value:

$$1/(\text{number of links at top}-1)=\text{increment value}.$$

If a user has put 5 links at the top of a category then the increment value for the user in the category if $1/(5-1)=0.25$.

One can use this amount to calculate the Link Popularity Value for the Category for each link as follows. The top most link has the value of 2, every link below that has a Link Popularity Value for the Category of $$2-(\text{increment value}*(\text{position}-1)).$$

Again, if a user has put 5 links at the top, one calculates the increment value of 0.25:
 The top most link has 2 points added to the Link Popularity Value for the Category
 The second link has 2−(0.25*(2−1))=1.75 points added to the Link Popularity Value for the Category
 The third link has 2—(0.25*(3−1))=1.50 points added to the Link Popularity Value for the Category
 The fourth link has 2—(0.25*(4−1))=1.25 points added to the Link Popularity Value for the Category
 The bottom of the top links has 1 point added to the Link Popularity Value for the Category Another example is as follows: If a user positions 11 links at the top of a category, then:
 The top most link has 2 points added to the Link Popularity Value for the Category
 The second link has 1.90 points added to the Link Popularity Value for the Category
 The 3rd link has 1.80 points added to the Link Popularity Value for the Category
 The 4th link has 1.70 points added to the Link Popularity Value for the Category
 The 5th link has 1.60 points added to the Link Popularity Value for the Category
 The 6th link has 1.50 points added to the Link Popularity Value for the Category
 The 7th link has 1.40 points added to the Link Popularity Value for the Category
 The 8th link has 1.30 points added to the Link Popularity Value for the Category
 The 9th link has 1.20 points added to the Link Popularity Value for the Category
 The 10th link has 1.10 points added to the Link Popularity Value for the Category
 The bottom of the top links has 1 point added to the Link Popularity Value for the Category In this manner every link in every category will have a collective Link Popularity Value for the Category. This value is sometimes called the "popularity value" of the link. Note that the precise values used in the preferred formula above are illustrative of the invention and not intended to be limiting.

Users can order any category by the following criteria (each criterion can be ascending or descending)
 Alphabetical
 Age of web site
 Age of business, if applicable
 Proximity to a location (could be user's present location, another location (a zip code, a city, etc.))
 Popularity Value overall (defined above)
 Group Popularity Value—users can order the links by the Popularity Value of any group that they have access to.
Groups
DISE server users can define any number of groups to allow access to their index. They can also define any number of groups that they might share their entire index or parts of their index with. On the category level, a user can share every category with everyone, keep some categories private, or share different categories with different groups. On a link level, a user can share every link with everyone, keep some links private, or share different links with different groups. An index can also be owned by a group, rather than by a user.

The group can decide the level for each user. All users can have any of a number of permissions including, but not limited to:
 browse
 search
 propose links (but not automatically add them)
 add links (automatically added)
 propose deletions of links (but not automatically deleted)
 delete links (automatically deleted)
 change the hierarchy of the links in a category
 change the hierarchy of the categories
 change the name of a links
 change the name of the categories
 change the description of the links
 change the description of the categories
 change the look and feel of the index (fonts, colors, etc.)

Groups can make the user access whatever they want. Every user in the group can automatically add links or they can have an "Index Master(s)" who makes the decision whether the proposed changes should be made. The Index Master can use a simple yes/no method of adding the proposed changes to the index or can use a more advanced method for adding links.

The group index can be an index by itself or any group can create a new index by combining the index from every user's personal indexes.

In the preferred embodiment, if the group index is set up to be a combination of the individual group members personal indexes, then the group index would have rules for the combining of the index.

In the preferred embodiment the default group combination index would have:
 For every category the name of the category will be the name that is used by most users.
 The parent of the category (which determines the hierarchy) will be the parent that is used by most users.
 The description of any category will be the description used by the most users
 The name of the link will be the name used by most users
 The description of any link will be the description used by most users.
 The order that the links appear will be a combination of Link Popularity Value of the group for the Category The group will also have to have an order of members so that in the event of a tie in the factors above, the tie can be broken by the top member(s) of the group The group also can change these default values.
Other Platforms The DISE server does not have to be on web pages it can be a browser-add-on only. It can also be a phone application (such as for the iPhone® or Blackberry®) or used on any other electronic media platform.

A user does not need to have the index served to their web site, it can stay on the DISE server web site.

After the user specifies a subset of the internet for their index, when they search their index, they can choose to search their entire index or a subset of the topics in their index. For example if a user has the following categories/subcategories in his or her index:
 business
  investing
  management
 news
  newspapers
  television sports
>basketball
>football
>>NFL football
>>college football The user can choose to search his or her entire index, or a subset of his or her index. The user might choose to search just his or her "News" category or they might choose to search "Newspapers" and "College Football". Furthermore, the invention can be implemented such that the user has a plurality of indexes rather than just one.

A user can create a permanent or temporary index for search purposes only. The user can specify their interests by choosing categories of information and use that information for searching only (they need not be browsable).

In the preferred embodiment, a user can come to the DISE web site and specify a subset of categories, they can then perform a search of that subset of categories. The user can choose to use this category subset one time or to store it for subsequent searches. The user can store as many subsets for searching as they would like.

Adding Links to the Master Index

In the DISE server, as each user adds links to or deletes links from their index, these changes are proposed to the Master Index. There are two main advantages to this 1) each category is built and shaped by the people with the most interest in the category and 2) using the information obtained by a large group of people will make the Master Index more complete and more accurate.

As users add links to their index, they are proposed to the Master Index and if added to the Master Index. The user is rated by the number of links and the percentage of links that they proposed that get added to the Master Index for each category. Each link may be added to a category by one user or many users. One preferably uses the number of users who have added the link and the rating of the users in each category to add the best links first.

Similarly, as users delete links from their index, these deletions are proposed to the Master Index and if deleted from the Master Index, the user is given credit for deleting the link. In this manner each user is rated by the number of links and the percentage of links that they proposed that get deleted from the Master Index for each category. Each link may be deleted from a category by one user or many users. One preferably uses the number of users who have deleted the link and the rating of the users in each category to delete the worst links first.

Adding Links

When user adds a link to their index, the information for the link includes:
>The name of the link (default is the <title> tag of the link, but the user can change it).
>The URL of the link
>The description of the link (default is the meta description tag, but user can edit it)
>Where to put it (on top, on bottom, etc.)
>The geography of the link One preferably adds to this information:
>The user who recommended it
>The time and date recommended If the user does not use the default title tag for the link, then the user's custom title can be evaluated to add to the Master Index. Similarly, if a user does not use the default description for the link, then the user's custom description can be evaluated to add to the Master Index.

Every user is given a:
1. Link rating
2. Title rating
3. Description rating

In every category, these ratings are based on the percentage of the user's proposed links (or URL), titles and descriptions that are evaluated and then added to the Master Index.

When the user adds a link, their link is evaluated to be added to the Master Index by an Evaluator, which is a person or persons and/or an automatic filtering process/device. In the preferred embodiment, the Evaluator can only see the rating for the user(s) that have added the link, but does not know the identity of the individual.

As different users add links to their indexes, the links are given to the Evaluators in a certain order. The links are preferably ordered by one or more of:
1. The number of users who have added the link to the same category.
2. The average user percentage of the users that recommended the link. The higher the ranking of the users that recommends a link, the more likely it is to be a good link.
3. The age of the link recommendation. If all else is equal, we will evaluate links in chronological order.

The evaluator for a link first has to make a decision on the URL that is submitted. Is the web site appropriate for the category? If the answer is "no" then the evaluator rejects the link altogether and the evaluator chooses a reason for the rejection from a pre-determined list. This rejection list will include (but is not limited to):
>Web site content does not match category
>Web site is not appropriate for the index If rejected, the web site can be re-evaluated at a later time under certain conditions. Every user that has recommended the link for the category will then have a negative effect on their link rating due to the rejection of the link (because their link rating, which is the percentage of their links that have been accepted to the Master Index will fall).

If the URL of the web site is appropriate for the category and therefore added to the Master Index, then every user that has recommended the link for the category will then have a positive effect on their link rating (because their percentage will rise).

Once the link is deemed valid in the category, the Evaluator must choose a link title and description for the web site. In the preferred embodiment, the evaluator is shown both information from the page (the <title> tag from the page and the meta description of the page), and a title and description set from the highest rated user(s). The Evaluator sees the title from the user with the highest title rating that has submitted a custom title and the description from the user with the highest description rating that has submitted a custom description.

The evaluator can choose the title from the <title> tag of the page or choose the title from the user with the highest Title rating or reject both. The Evaluator is also allowed to make changes to information before accepting it. If the Evaluator chooses the title from the page's <title> tag, then no user's Title rating is affected. If the evaluator uses the title from user then the user is given credit for submitting the accepted custom title, which has a positive effect on the user's Title rating. If the Evaluator rejects both the <title> tag title and the custom title from the user then 1) the user's Title rating is negatively affected by the rejection and 2) the evaluator is presented with the custom title from the user with the next highest Title rating (if one exists). As before, the Evaluator can then accept or reject this new title. This process continues until the Evaluator accepts a title for the link. Evaluators will have to write titles, if necessary. But the process is meant to minimize this.

Furthermore, the Evaluator can choose the description from the description meta tag of the page or choose the description from the user with the Description Title rating or reject both. The Evaluator is also allowed to make changes to information before accepting it. If the Evaluator chooses the title from the page's description meta tag, then no user's Description rating is affected. If the evaluator uses the description from user then the user is given credit for submitting the accepted custom description, which has a positive effect on the user's Description rating. If the Evaluator rejects both the description meta tag title and the custom description from the user then 1) the user's Description rating is negatively affected by the rejection and 2) the evaluator is presented with the custom description from the user with the next highest Description rating (if one exists). As before, the Evaluator can then accept or reject this new description. This process continues until the Evaluator accepts a description for the link. Evaluators will have to write some descriptions, if necessary. But the process is meant to minimize this.

Each Evaluator will have one or more Supervisors that check their work. The Evaluators are then ranked by their accuracy in each category. In other words, the Supervisor will determine if the Evaluator correctly added links as well as whether the evaluator correctly rejected the links in the category. In this manner, the Evaluators "specialize" in categories. Thus as links are added in a category, they are evaluated by the Evaluators with the highest rating in the category. This method leads to much better Master Index.

Deleting Links

When any user deletes a link from their index, the deletion is suggested to the Master Index.

For each category, the users receive a "Deletion rating" according to the percentage of the links that they delete from their index that get deleted from the Master Index. This Deletion rating is much simpler than for additions.

The user Deletion rating is simply a percentage of the links that they delete from their index that are deleted from the Master Index in each category. For example, if a user has deleted 100 links from their index in the "crocheting" category, and 25 of those links were removed from the master Index, then the user has a 0.25 or 25% deletion percentage in the crocheting category.

As different users delete links from their indexes, the links are evaluated by the Evaluators in a certain order. The links are preferably ordered by one or more of:

1. The number of users who have deleted the link from the category.
2. The average user deletion percentage for the users that have deleted the link (the higher the deletion ranking of the user, the more likely it is to be a good link deletion)
4. The age of the link deletion. If all else is equal, we will evaluate links in chronological order.

The Evaluator for a deletion makes the decision as to whether the link should be deleted from the Master Index. In other words the Evaluator decides whether the web site is appropriate for the category. If the answer is "yes" then the Evaluator does not delete the link from the Master Index. Any user who deleted the link from the category will have a decrease in their Deletion rating.

If the deletion is rejected, the web site can be re-evaluated for deletion at a later time under certain conditions.

If the URL of the web site is not appropriate for the category, then the Evaluator marks the link for deletion from the Master Index and any user who deleted the link will have a receive credit for deleting the link and their Deletion rating will rise in the category.

Again, each Evaluator will have one or more Supervisors that check their work. The Evaluators are then ranked by their deletion accuracy in each category. In other words, the Supervisor determines if the Evaluator correctly deleted links as well as whether the evaluator correctly retained the links in the category. In this manner, the Evaluators "specialize" in deleting categories. Thus as links are deleted in a category, they are evaluated by the Evaluators with the highest deletion rating in the category. This method leads to a much better Master Index.

Categories can be added or deleted by users. When a user adds or delete a category, these changes are recommended to the master index. In the same way as links, users will be rated by the changes that they make to the categories that are accepted by the master index.

Note that in the specification and claims, "about" or "approximately" means within twenty percent (20%) of the numerical amount cited. All computer software disclosed herein may be embodied on any computer-readable medium (and be split among various mediums of the same or different types), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of improving the way a computer provides personalized advertising to users of internet web pages, the method comprising the steps of:
   a) providing an index server maintaining dynamic indices to internet web pages and employing a hierarchical plurality of topic categories whose contents are maintained and updated by the index server, wherein a master index is maintained as well as one for each user;
   b) permitting a user to customize the user's index by addition of an internet web page to the user's index in conjunction with one or more topic categories;
   c) permitting the user to customize the user's index by deleting, renaming, and re-hierarchializing topic categories and to specify any subset of the plurality of topic categories as customized by the user;
   d) performing customization value calculations to determine numeric customization values, each of the numeric customization values representing how much the user has customized a respective one of the topic categories;
   e) calculating a numeric interest value for at least some of the topic categories, wherein calculating a numeric interest value for at least some of the topic categories comprises using the numeric customization values for a respective one of the topic categories;
   f) at request of the user, executing a search of the index server in any category of the subset but only of categories in the subset; and
   g) serving to the user an advertisement based at least in part upon the calculated numeric interest value.

2. The method of claim 1 wherein the serving step comprises serving an advertisement additionally based upon categories in which the search produced matches.

3. The method of claim 1 wherein the customization value calculations are affected by the user adding to, deleting from and re-hierachicalization of each of the respective topic categories.

4. The method of claim 1 wherein the serving step comprises serving an advertisement additionally based upon categories browsed by the user.

5. The method of claim 1 additionally comprising the steps of permitting the user to propose addition of an internet web page to the master index in conjunction with one or more categories of the subset and automatically adding the proposed page to the user's index wherein the user can search the proposed page via the link information and wherein initially other users will not search the proposed page even if searching the proposed one or more categories.

6. The method of claim 1 wherein the serving step is additionally based upon topic categories matched in searches of the index by the user.

7. An apparatus that improves the way a computer provides personalized advertising for internet web pages, said apparatus comprising:
- an index server comprising a processor maintaining dynamic indices to internet web pages and employing a hierarchical plurality of topic categories whose contents are maintained and updated by said index server, wherein a master index is maintained as well as one for each user;
- a link permitting a user to customize the user's index by addition of an internet web page to the user's index in conjunction with one or more topic categories;
- a link permitting the user to customize the user's index by deleting, renaming, and re-hierarchializing topic categories and to specify any subset of said plurality of topic categories as customized by the user;
- a link permitting execution of searches of said index server in any category of said subset but only of categories in said subset; and
- an advertising server serving to the user an advertisement; said advertisement based at least in part on a numeric interest value, said numeric interest value calculated for at least some of the topic categories using a numeric customization value for each of a respective one of the topic categories, wherein each said numeric customization value is calculated based at least in part on how much the user has customized a respective one of the topic categories.

8. The apparatus of claim 7 wherein said advertising server serves an advertisement additionally based upon categories in which a search by the user produced matches.

9. The apparatus of claim 7 wherein said customization value calculations are affected by the user adding to, deleting from and re-hierachicalization of each of the respective topic categories.

10. The apparatus of claim 7 wherein said advertising server serves an advertisement additionally based upon categories browsed by the user.

11. The apparatus of claim 7 additionally comprising a link permitting the user to propose addition of an internet web page to said master index in conjunction with one or more categories of said subset and automatically adding said proposed page to said user's index wherein the user can search said proposed page via said link information and wherein initially other users will not search said proposed page even if searching said proposed one or more categories.

12. The apparatus of claim 7 wherein said advertising server serves an advertisement additionally based upon topic categories matched in searches of the index by the user.

13. A non-transitory computer readable medium comprising computer software stored thereon that improves the way that a computer provides personalized advertising capabilities for internet web pages, said software comprising:
- index server code maintaining dynamic indices to internet web pages and employing a hierarchical plurality of topic categories whose contents are maintained and updated by said index server code, wherein a master index is maintained as well as one for each user;
- link code permitting a user to customize the user's index by addition of an internet web page to the user's index in conjunction with one or more topic categories;
- link code permitting the user to customize the user's index by deleting, renaming, and re-hierarchializing topic categories and to specify any subset of said plurality of topic categories as customized by the user;
- link code adding to an internet web gage, controlled by the user, link information permitting execution of searches via said index server code in any category of said subset but only of categories in said subset; and
- advertising server code serving to the user an advertisement based at least in part on a numeric interest value, said numeric interest value calculated for at least some of the topic categories using a numeric customization value for each of a respective one of the topic categories, wherein each said numeric customization value is calculated based at least in part on how much the user has customized a respective one of the topic categories.

14. The computer readable medium of claim 13 wherein said advertising server code serves an advertisement additionally based upon categories in which a search by the user produced matches.

15. The computer readable medium of claim 13 wherein said customization value calculations are affected by the user adding to, deleting from and re-hierachicalization of each of the respective topic categories.

16. The computer readable medium of claim 13 wherein said advertising server code serves an advertisement additionally based upon categories browsed by the user.

17. The computer readable medium of claim 13 additionally comprising link code permitting the user to propose addition of an internet web page to said master index code in conjunction with one or more categories of said subset and automatically adding said proposed page to those indexed by said user's index code wherein the user can search said proposed page via said link information and wherein initially other users will not search said proposed page even if searching said proposed one or more categories.

18. The computer readable medium of claim 13 wherein said advertising server code serves an advertisement additionally based upon topic categories matched in searches of the index by the user.

* * * * *